(12) United States Patent
Nakano

(10) Patent No.: US 11,220,036 B2
(45) Date of Patent: Jan. 11, 2022

(54) FILM FORMING APPARATUS

(71) Applicant: SUMITOMO HEAVY INDUSTRIES MODERN, LTD., Kanagawa (JP)

(72) Inventor: Katsuyuki Nakano, Kanagawa (JP)

(73) Assignee: SUMITOMO HEAVY INDUSTRIES MODERN, LTD., Kanagawa (JP)

( * ) Notice: Subject to any disclaimer, the term of this patent is extended or adjusted under 35 U.S.C. 154(b) by 13 days.

(21) Appl. No.: 15/988,852

(22) Filed: May 24, 2018

(65) Prior Publication Data

US 2018/0264704 A1 Sep. 20, 2018

Related U.S. Application Data

(63) Continuation of application No. PCT/JP2016/084854, filed on Nov. 24, 2016.

(30) Foreign Application Priority Data

Nov. 27, 2015 (JP) .............................. JP2015-231898

(51) Int. Cl.
*B29C 48/92* (2019.01)
*B29C 48/10* (2019.01)
(Continued)

(52) U.S. Cl.
CPC .............. *B29C 48/92* (2019.02); *B29C 48/10* (2019.02); *B29C 48/325* (2019.02);
(Continued)

(58) Field of Classification Search
CPC ....... B29C 48/92; B29C 48/327; B29C 48/10; B29C 48/325; B29C 48/30;
(Continued)

(56) References Cited

U.S. PATENT DOCUMENTS 4,171,195 A * 10/1979 Klein ...................... B29C 48/30
425/141
4,279,857 A * 7/1981 Feuerherm .............. B29C 48/32
264/541

(Continued)

FOREIGN PATENT DOCUMENTS

DE 90 07 535 U1 5/1992
DE 295 08 824 U1 8/1995
(Continued)

OTHER PUBLICATIONS

Espacenet English translation of JPH10337766A, retrieved Sep. 10, 2021 (Year: 2021).*

(Continued)

*Primary Examiner* — Francisco W Tschen
*Assistant Examiner* — Elisa H Vera
(74) *Attorney, Agent, or Firm* — Michael Best & Friedrich LLP

(57) ABSTRACT

A film forming apparatus includes a die device which extrudes a molten resin in a tube shape to form a film and a controller which controls the die device. The die device includes an inner peripheral member which defines an inner periphery of an annular discharge port, an outer peripheral member which surrounds the inner peripheral member and defines an outer periphery of the discharge port, and an adjustment portion which applies a load to at least one of the inner peripheral member and the outer peripheral member to elastically deform the at least one of the inner peripheral member and the outer peripheral member and change a radial width of the discharge port. The controller controls a thickness of the film with the load applied by the adjustment portion.

4 Claims, 17 Drawing Sheets

(51) Int. Cl.
    *B29C 48/325*     (2019.01)
    *B29C 55/28*     (2006.01)
    *B29C 48/25*     (2019.01)

(52) U.S. Cl.
    CPC ........ *B29C 48/327* (2019.02); *B29C 48/2528* (2019.02); *B29C 55/28* (2013.01); *B29C 2948/92152* (2019.02); *B29C 2948/92447* (2019.02); *B29C 2948/92628* (2019.02); *B29C 2948/92647* (2019.02); *B29C 2948/92904* (2019.02)

(58) Field of Classification Search
    CPC ...... B29C 2948/92628; B29C 48/2528; B29C 2948/92152; B29C 2948/92904; B29C 2948/92447; B29C 2948/92647; B29C 55/28
    See application file for complete search history.

(56) References Cited

U.S. PATENT DOCUMENTS

| | | | | |
|---|---|---|---|---|
| 4,592,710 | A | * | 6/1986 | Reifenhauser .......... B29C 48/30 425/141 |
| 5,110,518 | A | | 5/1992 | Halter |
| 5,217,721 | A | * | 6/1993 | Reifenhauser .......... B29C 48/92 425/72.1 |
| 9,700,911 | B2 | | 7/2017 | Nakano |
| 2006/0057405 | A1 | * | 3/2006 | Kagawa ................ B32B 37/203 428/458 |
| 2012/0024226 | A1 | * | 2/2012 | Nakano ................. B29C 48/08 118/663 |
| 2015/0064302 | A1 | * | 3/2015 | Feuerherm .......... B29C 48/3001 425/466 |

FOREIGN PATENT DOCUMENTS

| | | | | |
|---|---|---|---|---|
| EP | 0 501 137 | A1 | | 9/1992 |
| EP | 2915651 | A1 | * | 9/2015 ............. B29C 48/30 |
| JP | S51-006264 | A | | 1/1976 |
| JP | S54-108760 | U | | 1/1978 |
| JP | S58-037139 | B2 | | 8/1983 |
| JP | H03-164227 | A | | 7/1991 |
| JP | H04-015446 | Y2 | | 4/1992 |
| JP | H04-320825 | A | | 11/1992 |
| JP | H08-057935 | A | | 3/1996 |
| JP | H08-290455 | A | | 11/1996 |
| JP | H09-225995 | A | | 9/1997 |
| JP | H09-300432 | A | | 11/1997 |
| JP | H10337766 | A | * | 12/1998 ............. B29C 48/08 |
| JP | 3506499 | B2 | | 3/2004 |
| JP | 2004-330635 | A | | 11/2004 |
| JP | 2010-247343 | A | | 11/2010 |
| JP | 4985330 | B2 | | 7/2012 |
| JP | 2012-166365 | A | | 9/2012 |
| JP | 2016-036926 | A | | 3/2016 |

OTHER PUBLICATIONS

Search Report issued in European Patent Application No. 16868637.6, dated May 28, 2019.

International Search Report issued in Application No. PCT/JP2016/084854, dated Jan. 24, 2017.

* cited by examiner

FILM FORMING APPARATUS

RELATED APPLICATIONS

Priority is claimed to Japanese Patent Application No. 2015-231898, filed Nov. 27, 2015, and International Patent Application No. PCT/JP2016/084854, the entire content of each of which is incorporated herein by reference.

BACKGROUND

Technical Field

Certain embodiments of the present invention relate to a film forming apparatus.

Description of Related Art

A film forming apparatus which solidifies a molten resin extruded in a tube shape from an annular discharge port of a die device to form a film is known. In the related art, there has been proposed a film forming apparatus provided with a die device capable of partially changing a width of the discharge port by pressing an outer peripheral member defining an outer periphery of the annular discharge port by a bolt so as to elastically deform the outer peripheral member. By partially changing the width of the discharge port, a thickness of the film can be partially controlled in a circumferential direction.

SUMMARY

According to an embodiment of the present invention, there is provided a film forming apparatus including a die device which extrudes a molten resin in a tube shape to form a film and a controller which controls the die device. The die device includes an inner peripheral member which defines an inner periphery of an annular discharge port, an outer peripheral member which surrounds the inner peripheral member and defines an outer periphery of the discharge port, and an adjustment portion which applies a load to at least one of the inner peripheral member and the outer peripheral member to elastically deform the at least one of the inner peripheral member and the outer peripheral member and change a radial width of the discharge port. The controller controls a thickness of the film with the load applied by the adjustment portion.

DETAILED DESCRIPTION

Figure 1:
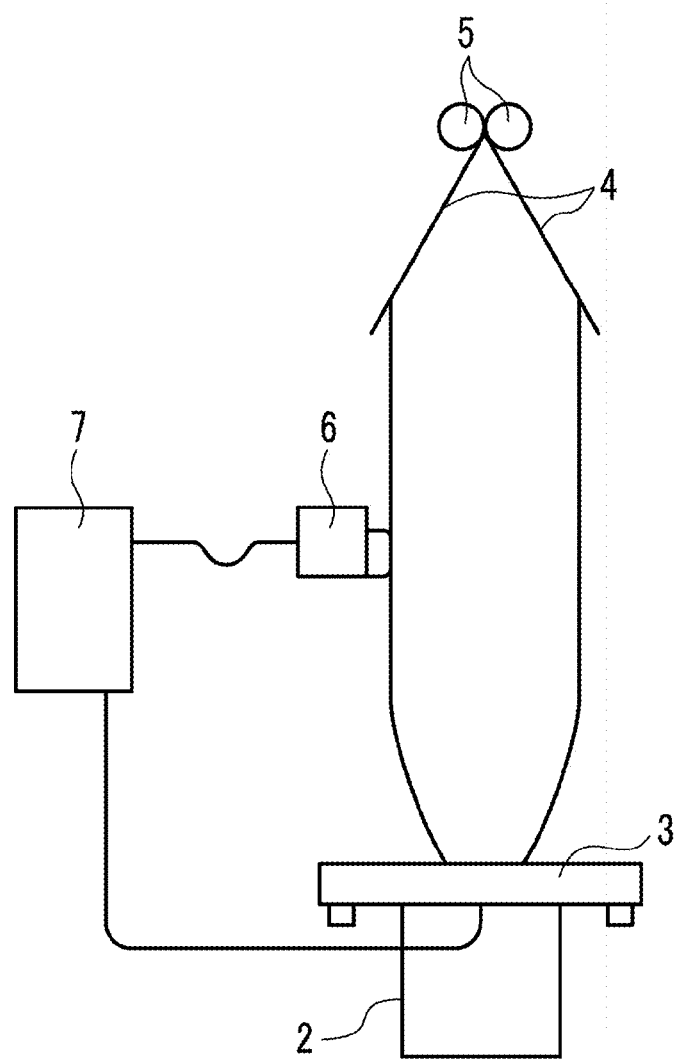
FIG. 1 is a view showing a schematic configuration of a film forming apparatus according to a first embodiment.

In the film forming apparatus of the related art as disclosed in the related art, the thickness of the film is controlled by regulating a movement amount (screw insertion amount) of the bolt pressing the outer peripheral member. However, the vicinity of the die device becomes a relatively high temperature due to heat for melting the resin, and thus, the bolt pressing the outer peripheral member receives the heat and may be thermally expanded. This adversely affects precision of controlling the thickness of the film in a case where the movement amount of the bolt is regulated so as to control the thickness of the film.

It is desirable to provide a film forming apparatus capable of controlling the thickness of the film with relatively high accuracy.

In addition, aspects of the present invention include arbitrary combinations of the above-described elements and mutual substitution of elements or expressions of the present invention among apparatuses, methods, systems, or the like.

According to embodiments of the present invention, it is possible to provide the film forming apparatus capable of controlling the thickness of the film with relatively high accuracy.

Hereinafter, the same reference numerals are assigned to the same or equivalent components and members shown in the each drawing are denoted by the same reference numerals, and overlapping description thereof are appropriately omitted. In addition, the dimensions of the members in each drawing are appropriately enlarged and reduced for easy understanding. Moreover, in each drawing, the embodiment is described such that some of the members not important for explaining the embodiment are omitted.

First Embodiment

FIG. 1 shows a schematic configuration of a film forming apparatus 1 according to a first embodiment. The film forming apparatus 1 forms a tube-shaped film. The film forming apparatus 1 includes a die device 2, a cooling device 3, a pair of stabilizing plates 4, a pair of pinch rollers 5, a thickness sensor 6, and a controller 7.

The die device 2 forms a molten resin supplied from an extruder (not shown) in a tube shape. Particularly, the die device 2 extrudes the molten resin from a ring-shaped slit 18 (described later in FIG. 2) and forms the molten resin in a tube shape. The cooling device 3 is disposed above the die device 2. The cooling device 3 blows cooling air from the outside to the molten resin extruded from the die device 2. The molten resin is cooled, and thus, the film is formed.

The pair of stabilizing plates 4 is disposed above the cooling device 3 and guides the formed film to a portion between the pair of pinch rollers 5. The pinch rollers 5 are disposed above the stabilizing plates 4 and flatly fold the guided film while pulling the film. The folded film is wound up by a winder (not shown).

The thickness sensor 6 is disposed between the cooling device 3 and the stabilizing plates 4. The thickness sensor 6 measures the thickness of the film while wrapping around the tube-shaped film. A measurement result measured by the thickness sensor 6 is sent to the controller 7. The controller 7 sends a control command corresponding to the measurement result accepted from the thickness sensor 6 to the die device 2. The die device 2 receives the control command and adjusts a width of a slit 18 (particularly, a discharge port thereof) so as to reduce variations in the thickness.

Figure 2:
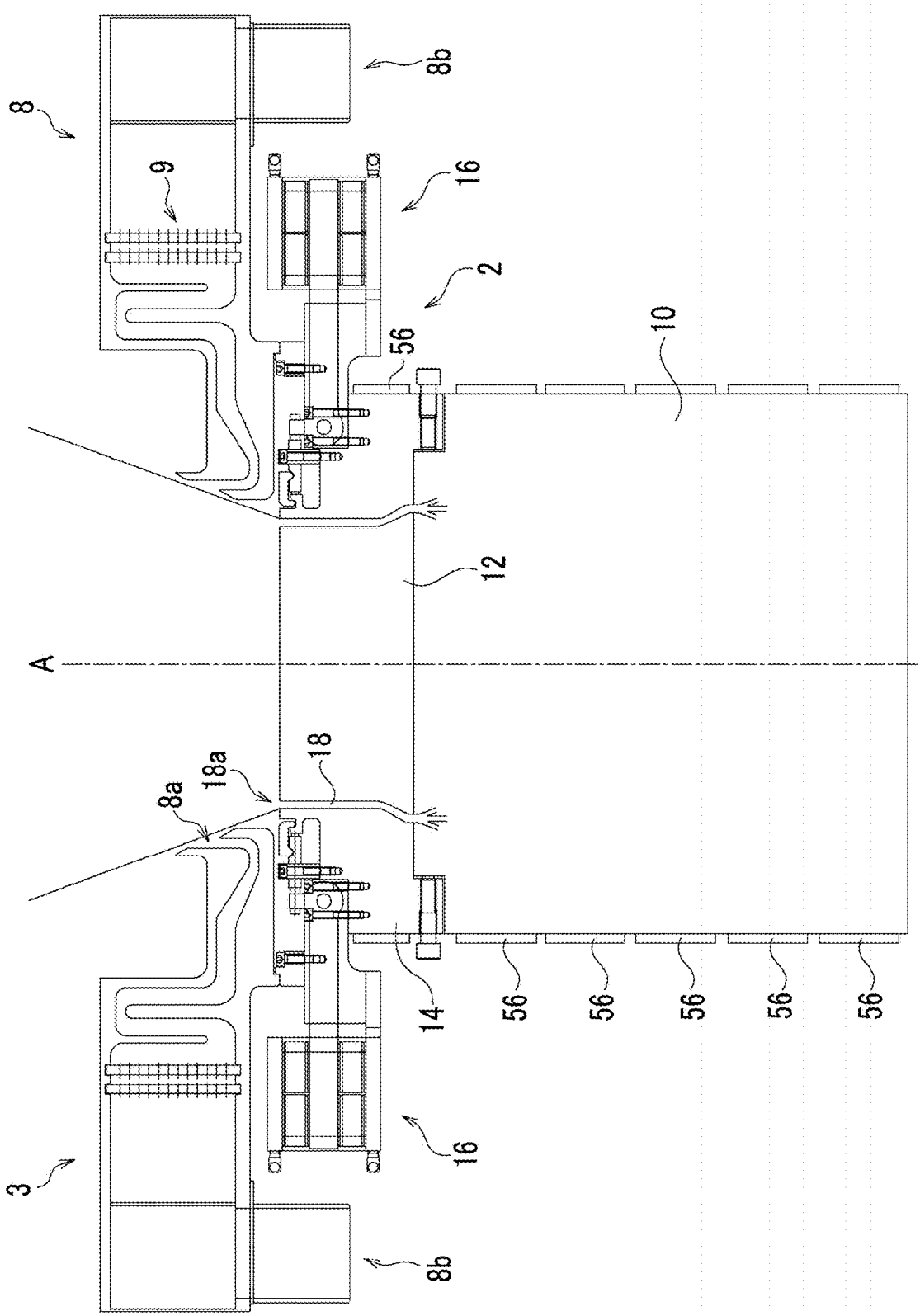
FIG. 2 is a sectional view showing an upper portion of a die device of FIG. 1 and the vicinity of the upper portion.
Figure 3:
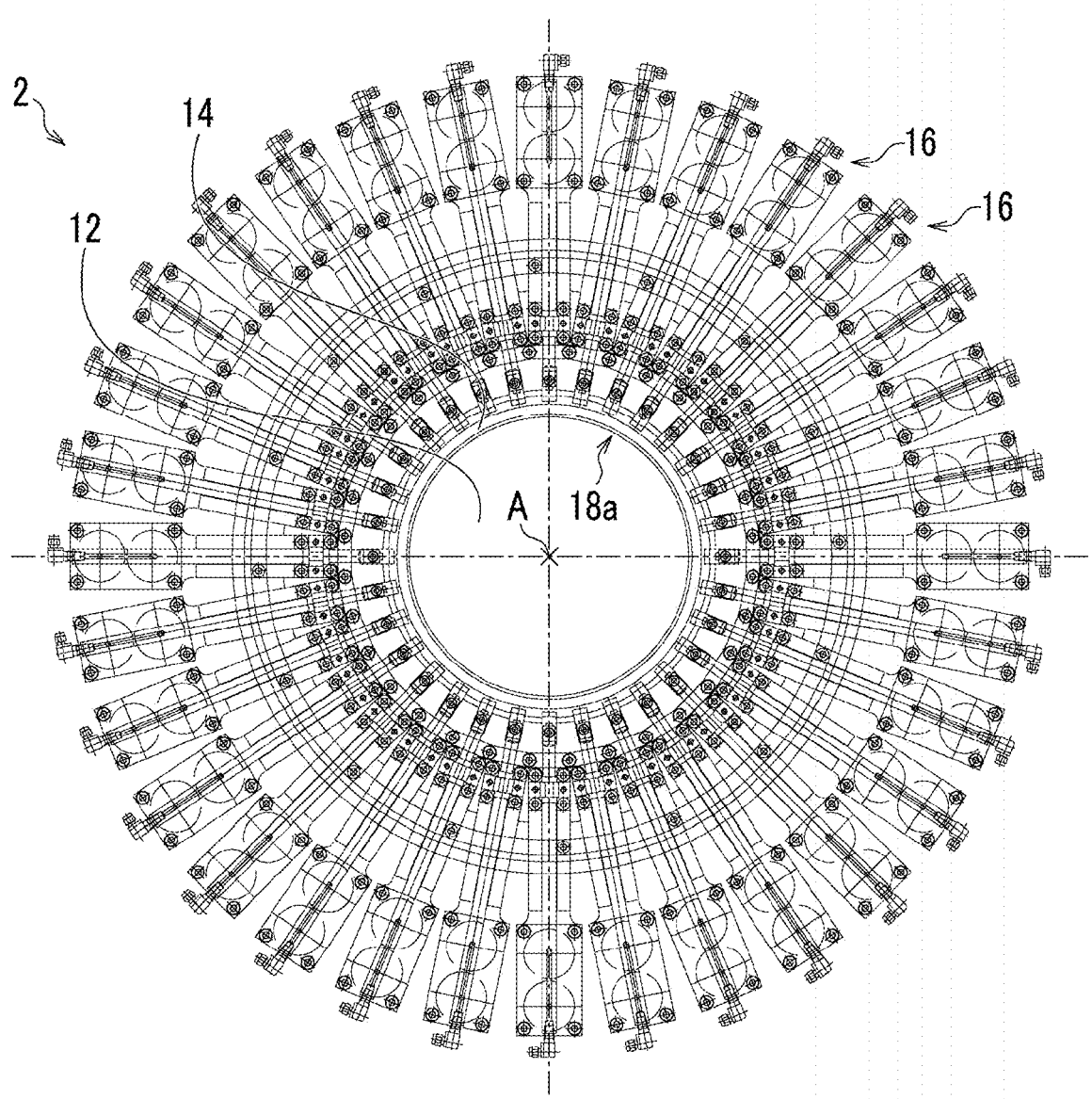
FIG. 3 is a top view of the die device of FIG. 1.

FIG. 2 is a sectional view showing an upper portion of the die device 2 and the vicinity of the upper portion. FIG. 3 is a top view of the die device 2. In FIG. 3, the cooling device 3 is not shown.

The cooling device 3 includes an air ring 8 and an annular rectifying member 9. The air ring 8 is a ring-shaped casing of which an inner peripheral portion is recessed downward. A ring-shaped discharge port 8a having an open upper side is formed on an inner peripheral portion of the air ring 8. Particularly, the discharge port 8a is formed to be concentric with the ring-shaped slit 18 having a center axis A as a center.

In addition, hereinafter, a direction parallel to the center axis A is referred to as an axial direction, any direction passing through the center axis A on a plane surface perpendicular to the center axis A is referred to as a radial direction, a side close to the center axis A is referred to as an inner peripheral side, a side away from the center axis A is referred to as an outer peripheral side, and a direction along a circumference of a circle having the center axis A as a center on the plane perpendicular to the center axis A is referred to a circumferential direction.

A plurality of hose ports 8b are formed on an outer peripheral portion of the air ring 8 at equal intervals in the circumferential direction. A hose (not show) is connected to each of the plurality of hose ports 8b and the cooing air is fed from a blower (not show) into the air ring 8 via the hoses. The cooling air fed into the air ring 8 is blown out from the discharge port 8a and is sprayed on the molten resin.

The rectifying member 9 is disposed in the air ring 8 to surround the discharge port 8a. The rectifying member 9 rectifies the cooling air fed into the air ring 8. Accordingly, the cooling air blows out from the discharge port 8a with a uniform flow rate and wind speed in the circumferential direction.

The die device 2 includes a die body 10, an inner peripheral member 12, an outer peripheral member 14, and a plurality of (here, 32) adjustment portions 16. The inner peripheral member 12 is an approximately columnar member which is disposed on an upper surface of the die body 10. The outer peripheral member 14 is an annular member and surrounds the inner peripheral member 12. A slit 18 extending in a ring shape in the vertical direction is formed between the inner peripheral member 12 and the outer peripheral member 14. The molten resin flows upward through the slit 18, the molten resin is extruded from a discharge port (that is, an upper end opening) 18a of the slit 18 and is cooled by the cooling device 3, and thus, a film having a thickness corresponding to a width of the discharge port 18a is formed. A plurality of heaters 56 are mounted on an outer periphery of the die body 10. In addition, the heater 56 is mounted on an outer periphery of a lower portion (specifically, a large-diameter portion 27 described later) of the outer peripheral member 14. The die body 10 and the outer peripheral member 14 are heated to a desired temperature by the heaters 56. Accordingly, a temperature and a molten state of the molten resin flowing through the inside of the die device 2 can be appropriately held.

The plurality of adjustment portions 16 are disposed in the circumferential direction with substantially no gap so as to surround an upper end side of the outer peripheral member 14. Particularly, each of the plurality of adjustment portions 16 is attached to the outer peripheral member 14 in a cantilever manner. The cooling device 3 is fixed to a portion above the plurality of adjustment portions 16. Each of the plurality of adjustment portions 16 can apply a radially inward pressing load or a radially outward tensile load to the outer peripheral member 14. Accordingly, the width of the discharge port 18a can be partially adjusted in the circumferential direction and the thickness of the film can be partially controlled in the circumferential direction by adjusting the plurality of adjustment portions 16. For example, in a case where variations in the thickness of the film occur, a tensile load is applied from the adjustment portion 16 (for example, is disposed below a portion having a small thickness) corresponding to the portion having a small thickness to the outer peripheral member 14, and thus, the gap of the discharge port 18a below the portion having a small thickness increases. Accordingly, the variations in the thickness of the film decrease.

Figure 4:
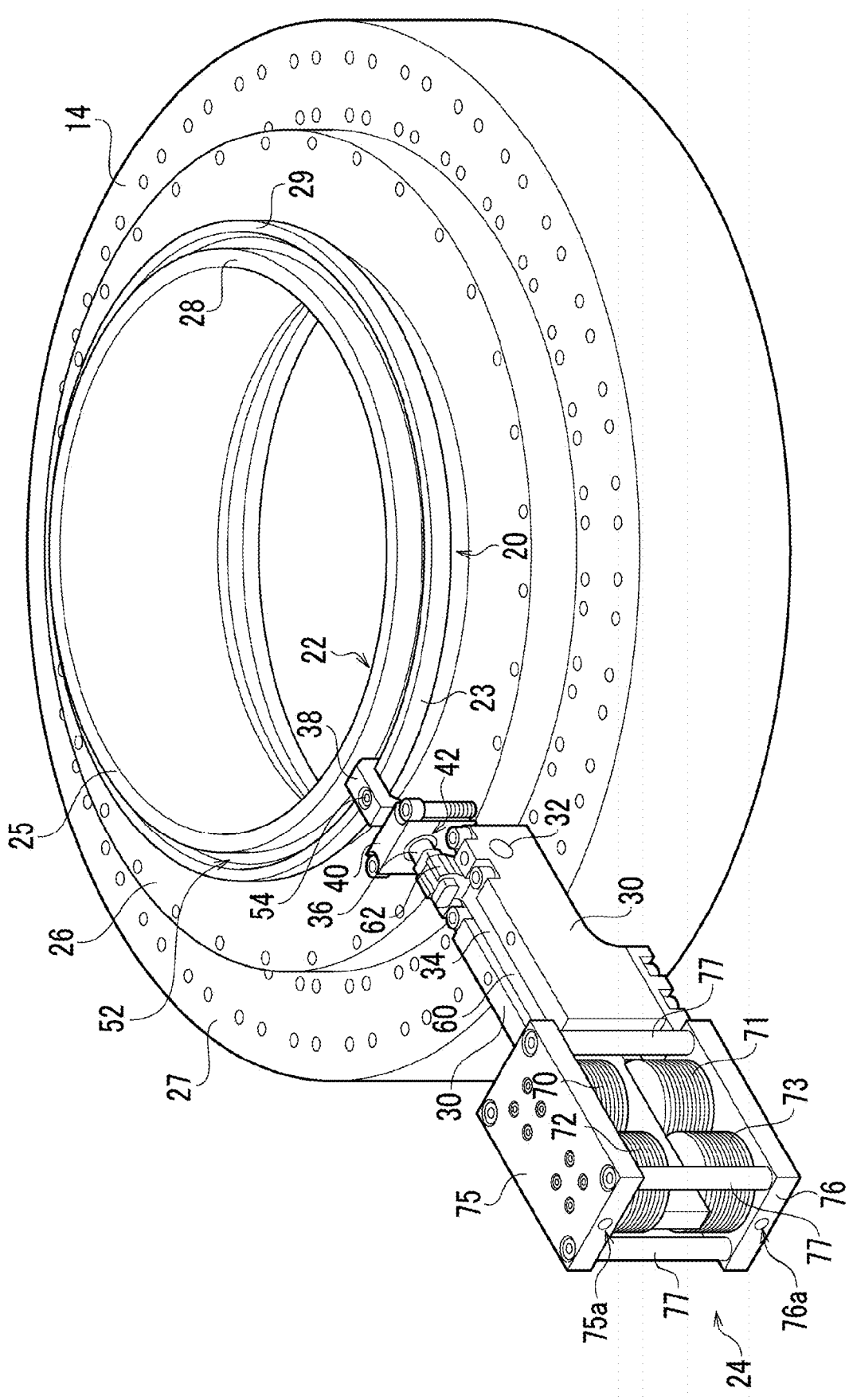
FIG. 4 is a perspective view showing an upper portion of an outer peripheral member of FIG. 2 and an adjustment portion attached to the upper portion.
Figure 5:
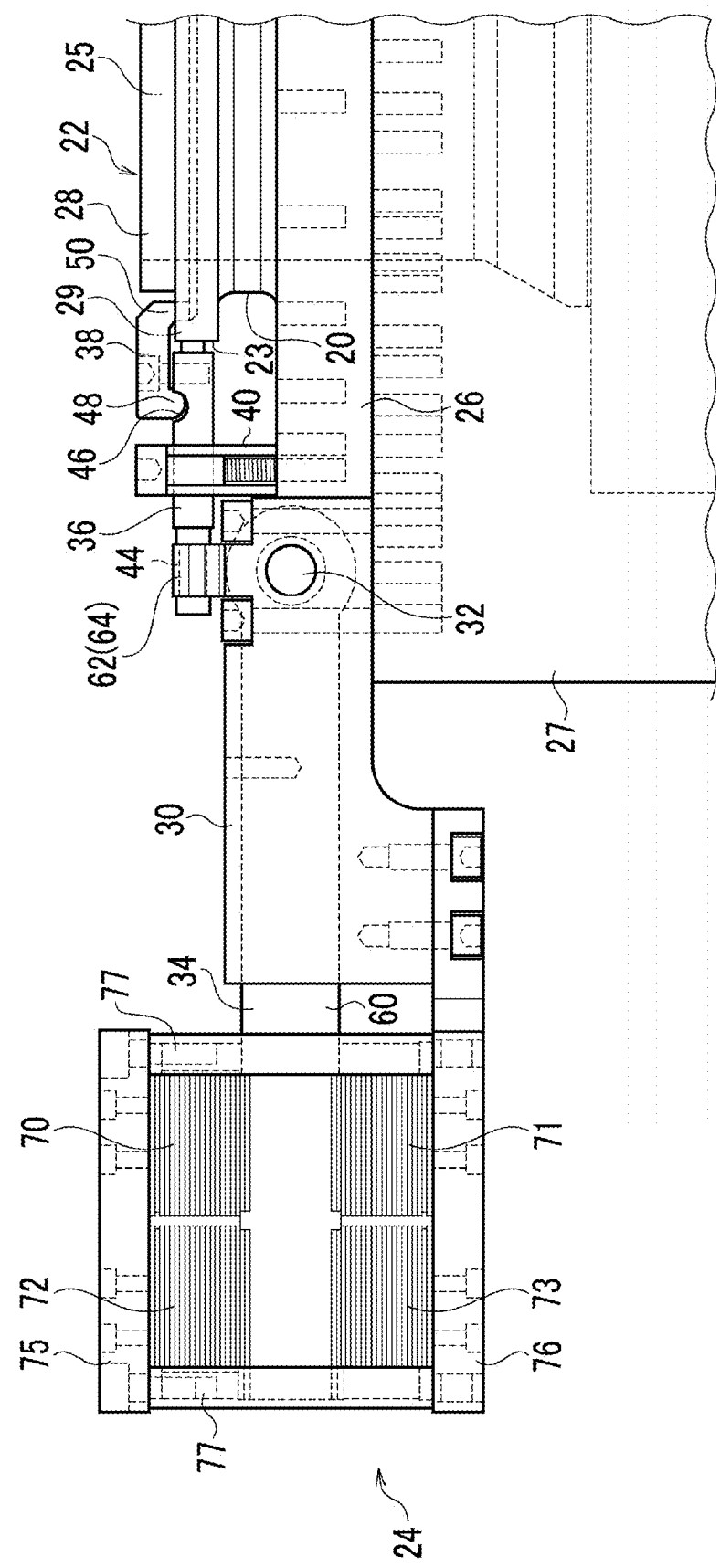
FIG. 5 is a side view showing the upper portion of the outer peripheral member of FIG. 2 and the adjustment portion attached to the upper portion.
Figure 6:
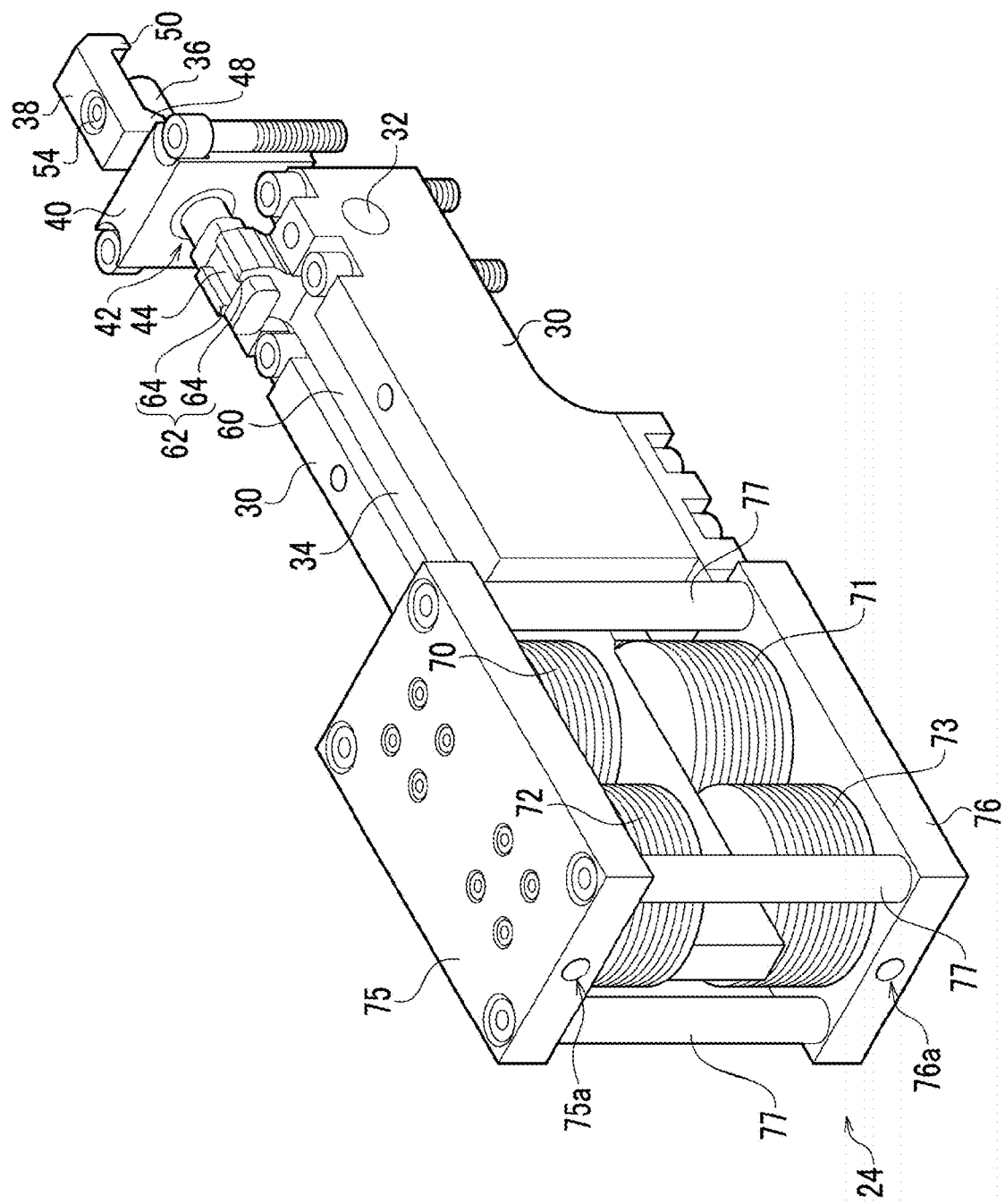
FIG. 6 is a perspective view showing the adjustment portion of FIG. 2.
Figure 7:
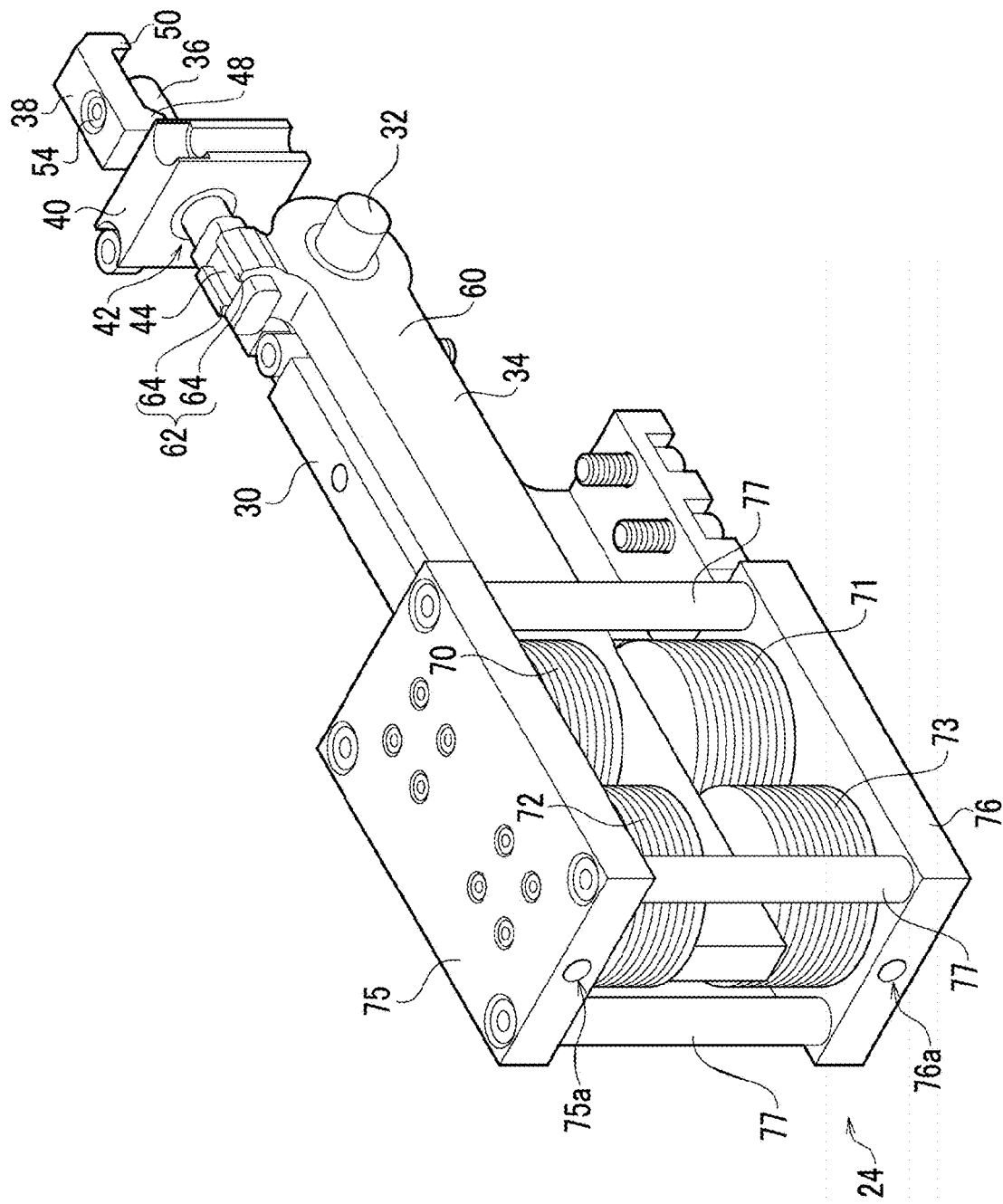
FIG. 7 is a perspective view showing the adjustment portion of FIG. 2.

FIGS. 4 and 5 respectively are a perspective view and a side view showing an upper portion of the outer peripheral member 14 and the adjustment portion 16 attached to the upper portion. In FIGS. 4 and 5, only one adjustment portion 16 is shown, and the remaining adjustment portions 16 are not shown. FIGS. 6 and 7 are perspective views showing the adjustment portion 16. FIG. 7 shows a state where one of a pair of support members 30 is removed.

A smaller-diameter portion 25 which is formed on an upper end of the outer peripheral member 14, an intermediate-diameter portion 26 which is formed to have a diameter larger than that of the small-diameter portion 25 below the small-diameter portion 25, and a large-diameter portion 27 which is formed to have a diameter larger than that of the intermediate-diameter portion 26 below the intermediate-diameter portion 26 are provided on the upper portion of the outer peripheral member 14. The small-diameter portion 25 includes a flexible lip portion 22. The flexible lip portion 22 is a portion of the small-diameter portion 25 disposed above a recessed notch portion 20 provided in the circumferential direction. The flexible lip portion 22 is elastically deformed with the notch portion 20 as a boundary. The flexible lip portion 22 includes a cylindrical body portion 28 and an annular protruding surrounding portion 29 which protrudes radially outward from the body portion 28.

The adjustment portion 16 includes a pair of support members 30 which is attached to the outer peripheral member 14, a rotary shaft 32 which is fixed to the pair of support members 30, a lever 34 which is rotatably supported by the rotary shaft 32 as a fulcrum, an operation rod 36 which receives a rotation force generated by the lever 34 and is operated in the axial direction, a connection member 38 which connects the operation rod 36 and the flexible lip portion 22 to each other in the axial direction, a bearing member 40 which slidably supports the operation rod in the axial direction, and an actuator 24 which applies the rotation force to the lever 34.

Each of the pair of support members 30 is a flat plate shape, and the support members 30 are screwed to the outer peripheral member 14 so as to be parallel to each other. A space is provided between the pair of support members 30 such that the lever 34 is interposed therebetween. The bearing member 40 is formed in a rectangular parallelepiped shape and is screwed to the outer peripheral member 14 on the radially inner side of the support member 30. An insertion hole 42 penetrating the bearing member 40 in the radial direction is formed in the bearing member 40. An inner peripheral surface of the insertion hole 42 configures a so-called sliding bearing (an oil-free type bearing) and slidably supports the operation rod 36.

The rotary shaft 32 is fixed to the pair of support members 30 such that an axis of the rotary shaft 32 is oriented in the horizontal direction and is approximately perpendicular to the support members 30 in the radial direction.

The operation rod 36 is formed in a stepped columnar shape and an intermediate portion of the operation rod 36 is inserted into the insertion hole 42 of the bearing member 40. A reduced diameter portion 44 is provided radially outside the operation rod 36. As described later, the reduced diameter portion 44 functions as a connection portion between the reduced diameter portion 44 and the lever 34. A recessed engagement portion 46 is provided radially inside the operation rod 36. As described later, the engagement portion 46 functions as a connection portion between the engagement portion 46 and the connection member 38. An outer peripheral surface (hereinafter, referred to as a "pressure receiving surface 23") of the protruding surrounding portion 29 of the flexible lip portion 22 faces a tip surface of the operation rod 36.

The connection member 38 is formed in a bifurcate shape in a longitudinal sectional view. Specifically, in the connection member 38, engagement portions 48 and 50 protruding downward are provided on a surface facing the outer peripheral member 14 in the axial direction. The engagement portion 48 is approximately complementary to the engagement portion 46 of the operation rod 36. In addition, an annular engagement groove 52 which is recessed downward axially is formed in the protruding surrounding portion 29 of the flexible lip portion 22. The engagement portion 50 is complementary to the engagement groove 52.

The operation rod 36 and the connection member 38 are screwed to each other such that the engagement portion 48 engages with the engagement portion 46 and the engagement portion 50 engages with the engagement groove 52. Surfaces of the engagement portion 48 and the engagement portion 46 facing each other are tapered surfaces. Accordingly, as a screw 54 is fastened, the tip surface of the operation rod 36 is pressed to the pressure receiving surface 23 of the flexible lip portion 22 and the operation rod 36 and the flexible lip portion 22 are securely fixed to each other. A portion of the flexible lip portion 22 is interposed between the engagement portion 50 of the connection member 38 and the tip portion of the operation rod 36. Accordingly, the operation rod 36 is connected to the flexible lip portion 22 in the axial direction.

The lever 34 includes an elongated plate-like main body 60 which extends in the radial direction, and one end of the lever 34 is rotatably supported by the rotary shaft 32. The lever 34 is provided such that the main body 60 and the operation rod 36 are approximately parallel to each other in a non-operation state. In addition, a bifurcated connection portion 62 is provided to extend in a direction perpendicular to an axis of the main body 60 from one end portion of the main body 60. That is, the connection portion 62 includes a pair of connection pieces 64, a gap between the connection pieces 64 is slightly larger than an outer diameter of the reduced diameter portion 44 of the operation rod 36, and a width therebetween is slightly smaller than a length of the reduced diameter portion 44. According to this configuration, the lever 34 and the operation rod 36 are connected to each other in a state where the connection portion 62 is fitted to the reduced diameter portion 44.

In addition, the configuration in which the rotation force of the lever 34 is directly applied to the operation rod 36 is described. However, the present invention is not limited to the present embodiment. For example, the connection portion 62 may not extend in the perpendicular direction from the axis of the main body 60. An angle between the axis of the main body 60 and the extension direction of the connection portion 62 may be an acute angle or may be an obtuse angle. In addition, the main body 60 and the operation rod 36 may not be parallel to each other in the non-operation state of the lever 34.

In the present embodiment, the actuator 24 is a pneumatic drive type actuator, and includes two sets of bellows 70, 72 and bellows 71, 73 which are operated by supply and discharge of compressed air, a first base 75, a second base 76 which is disposed below the first base 75 in the axial direction, and four connection rods 77. The first base 75 and the second base 76 are disposed to be separated from each other in the axial direction and connected to each other by four connection rods 77. The bellows 70 and 72 are disposed between the lever 34 and the first base 75, and the bellows 71 and 73 are disposed between the lever 34 and the second base. That is, an end portion of the lever 34 which becomes a force point of the lever 34 is supported so as to be interposed between the bellows 70 and 72 and the bellows 71 and 73. The compressed air is supplied to one of the bellows 70 and 72 or the bellows 71 and 73, and thus, the lever 34 is rotationally driven clockwise or counterclockwise in the drawing.

In FIG. 5, if a pressure is applied to the bellows 70 and 72 by the supply of the compressed air and the bellows 70 and 72 extend, the lever 34 is rotated counterclockwise in the drawing, and the rotation force is converted into a force of the operation rod 36 toward the left side in the axial direction (the outer side in the radial direction). As a result, a tensile load is applied to the flexible lip portion 22, and the flexible lip portion 22 is changed in a direction in which the gap between the flexible lip portion 22 and the portion of the discharge port 18a of the corresponding (that is, on the radially inner side of the adjustment portion 16) slit 18 increases. Meanwhile, if a pressure is applied to the bellows 71 and 73 by the supply of the compressed air and the bellows 71 and 73 extend, the lever 34 is rotated clockwise in the drawing, and the rotation force is converted into a force of the operation rod 36 toward the right side in the axial direction (the inner side in the radial direction). As a result, a pressing load is applied to the flexible lip portion 22, and the flexible lip portion 22 is changed in a direction in which the gap between the flexible lip portion 22 and the portion of the discharge port 18a of the corresponding slit 18 decreases.

In order to realize the pneumatic drive, the compressed air is supplied from a pressure regulator (not shown) via a supply path 75a formed in the first base 75 and a supply path 76a formed in the second base 76. The pressure regulator controls pressures in the bellows 70 to 73, based on a control command from an adjustment operation control unit 83 (described later).

Figure 8A:
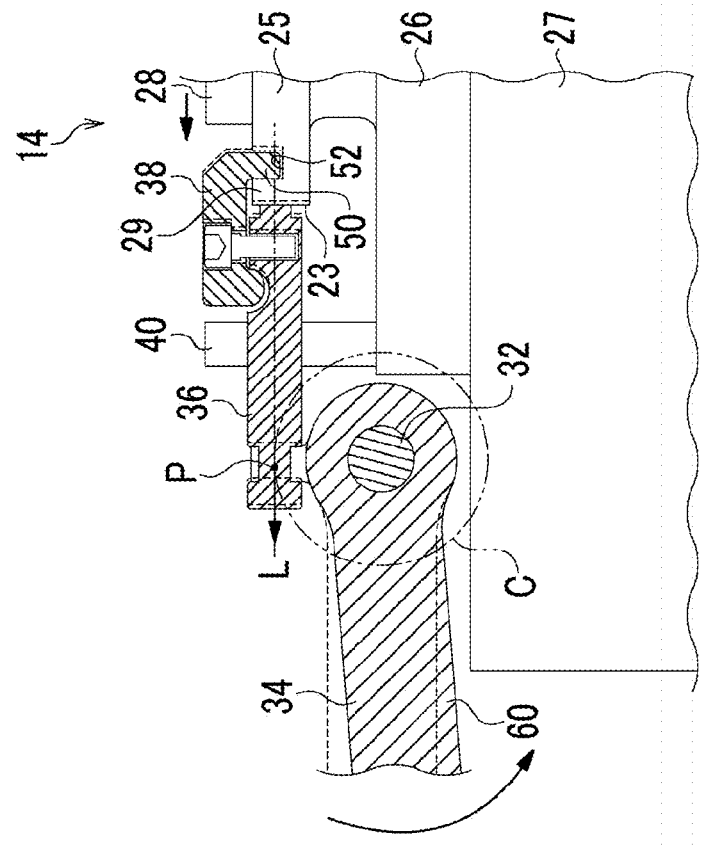
FIGS. 8A and 8B are explanatory views for explaining an operation of the adjustment portion.
Figure 8B:
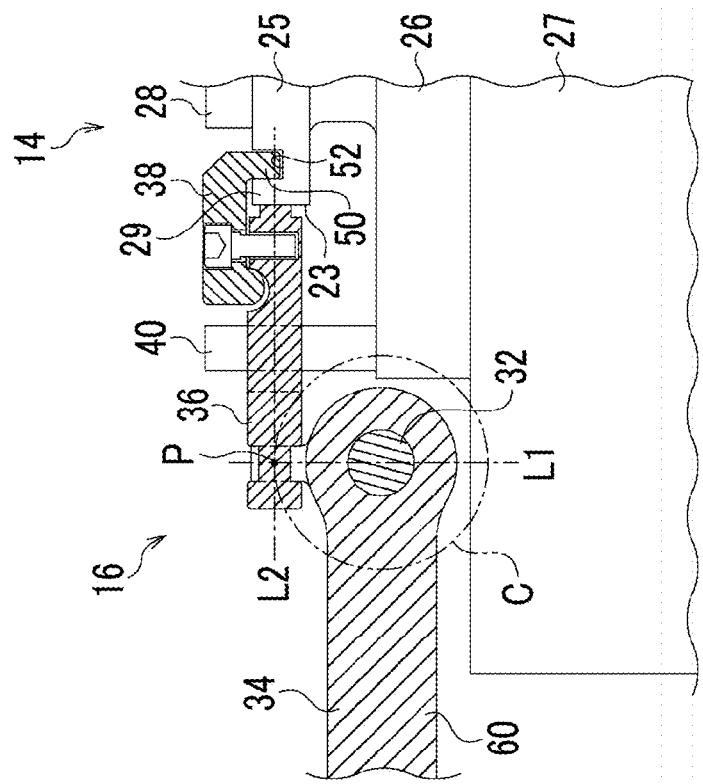

FIGS. 8A and 8B are explanatory views for explaining an operation of the adjustment portion 16. FIG. 8A shows a neutral state (all the bellows 70 to 73 are in the non-operation states) of the adjustment portion 16, and FIG. 8B shows an expansion operation state (a state where only the bellows 70 and 72 are operated) of the adjustment portion 16.

According to the adjustment portion 16, the rotation force of the lever 34 is directly applied to the operation rod 36 at an action point P. That is, the rotation force of the lever 34 is applied to the flexible lip portion 22 as an axial force of the operation rod 36. In this case, the operation rod 36 is stably supported by the outer peripheral member 14, the axial force is effectively transmitted to the flexible lip portion 22. As a result, a drive force for adjusting a gap between the inner peripheral member 12 and the outer peripheral member 14 can be effectively operated.

In the present embodiment, as shown in FIG. 8A, a straight line L1 which connects a connection point (the action point P of the lever 34) between the lever 34 and the operation rod 36 and the rotary shaft 32 (a fulcrum of the lever 34) to each other is orthogonal to an axis L2 of the operation rod 36. Accordingly, a tangential direction of an imaginary circle which has the rotary shaft 32 as a center and passes through the action point P and the axial direction of the operation rod 36 coincide with each other.

Accordingly, as shown in FIG. 8B, the direction of the rotation force of the lever 34 at the action point P coincides with the axial direction of the operation rod 36. As a result, the rotation force of the lever 34 becomes the drive force of the operation rod 36 in the axial direction as it is, and transmission efficiency of the force can be maximized. That is, the drive force of the actuator 24 can be extremely efficiently operated when the flexible lip portion 22 is operated to be expanded (refer to a thick arrow in the drawing).

Although it is not shown, even in a narrow operation state (a state where only the bellows 71 and 73 are operated) of the adjustment portion 16, only the direction of the force in FIG. 8B is reversed, and thus, the direction of the rotation force of the lever 34 at the action point P coincides with the axial direction of the operation rod 36. As a result, similarly to the expansion operation, the rotation force of the lever 34 becomes the drive force of the operation rod 36 in the axial direction as it is, and the transmission efficiency of the force can be maximized. That is, according to the adjustment portion 16, the drive force for adjusting the gap of the discharge port 18a of the slit 18 can be efficiently operated.

Moreover, the configuration in which the rotation force of the lever 34 is directly applied to the operation rod 36 is described. However the present invention is not limited to the present embodiment. For example, an angle between an extension direction (the direction in which the rotary shaft 32 and the action point P are connected to each other) of the connection portion 62 and the axial direction of the operation rod 36 may be an acute angle or an obtuse angle, and as a result, a direction (for convenience, referred to as a "rotation force application direction") of the rotation force of the lever 34 at the action point P and the axial direction (for convenience, referred to as an "axial force application direction") of the operation rod 36 may not coincide with each other. In this case, the axis of the main body 60 and the extension direction of the connection portion 62 may form an acute or obtuse angle while the main body 60 and the operation rod 36 may be parallel to each other. Alternatively, the main body 60 and the operation rod 36 may not be parallel to each other while the axis of the main body 60 and the extension direction of the connection portion 62 may be perpendicular to each other. Alternatively, the axis of the main body 60 and the extension direction of the connection portion 62 may form an acute or obtuse angle, and the main body 60 and the operation rod 36 may not be parallel to each other. Moreover, as the main body 60, a configuration in which at least a portion of the main body 60 has a curved portion or a bent portion (a configuration in which the axis cannot necessarily be specified) may be adopted.

Figure 9:
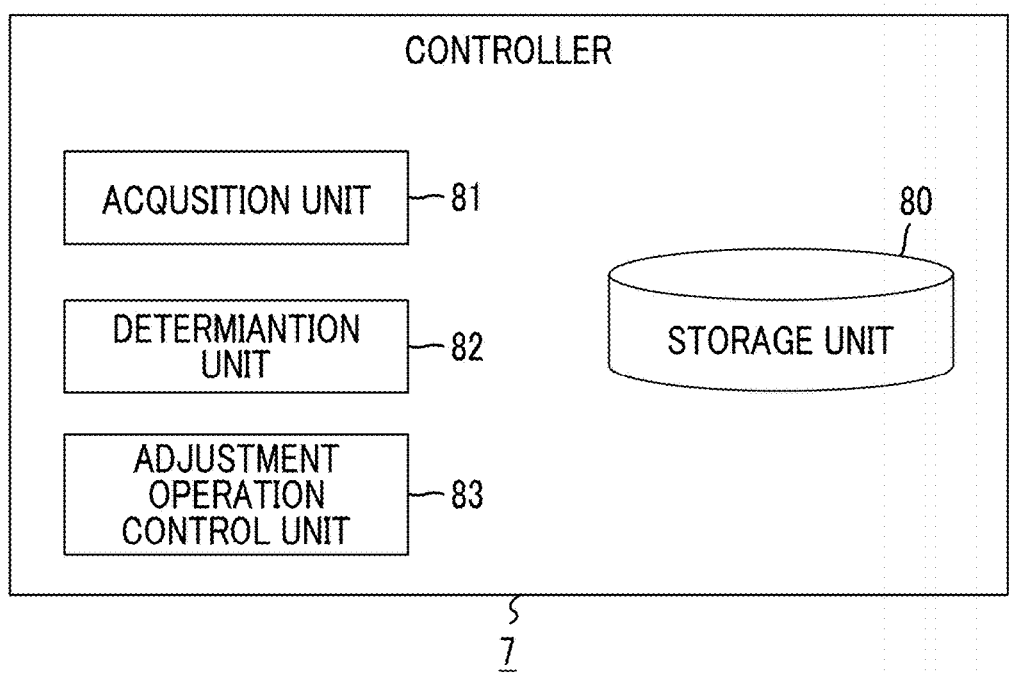
FIG. 9 is a block diagram schematically showing a function and a configuration of a controller of FIG. 1.

FIG. 9 is a block diagram schematically showing a function and a configuration of the controller 7. In terms of hardware, each block shown here can be realized by a device such as a CPU of a computer or a mechanical device, and realized by a computer program or the like in terms of software. However, each block is drawn as a functional block which is realized by cooperation of hardware and software. Therefore, a person skilled in the art will understand that these functional blocks can be realized in various forms according to a combination of hardware and software.

The controller 7 includes a storage unit 80, an acquisition unit 81, a determination unit 82, and an adjustment operation control unit 83. The acquisition unit 81 acquires the measurement result measured by the thickness sensor 6. The storage unit 80 stores the thickness of the film and a load to be applied to the outer peripheral member 14 by the adjustment portion 16 in association with each other. More specifically, the storage unit 80 stores the thickness of the film and the load to be applied to the outer peripheral member 14 by the adjustment portion 16 such that the film having the thickness is formed so as to have a target thickness, in association with each other.

The determination unit 82 determines the load to be applied to the outer peripheral member 14 by each adjustment portion 16 so as to decrease the variations in the thickness. Particularly, the determination unit 82 determines the load to be applied to the outer peripheral member 14 with reference to the thickness measured by the thickness sensor 6 and the storage unit 80. In addition, the determination unit 82 may calculate how many pressures of the bellows 70 to 73 of the adjustment portion 16 to be controlled so that the determined load is applied to the outer peripheral member 14. The adjustment operation control unit 83 sends the control command to the pressure regulator such that the pressures of the bellows 70 to 73 become the pressure calculated by the determination unit 82.

An operation of the film forming apparatus 1 configured as described above will be described.

The controller 7 ascertains the variations in the thickness of the film by the measurement result measured by the thickness sensor 6 and controls each adjustment portion 16 of the die device 2 such that the variations in the thickness decrease. In a case where the pressing load is applied to the adjustment portion 16, the controller 7 increases the pressures of the bellows 71 and 73 of the adjustment portion 16 to rotate the lever 34 clockwise. In addition, in a case where the tensile load is applied to the adjustment portion 16, the controller 7 increases the pressures of the bellows 70 and 72 of the adjustment portion 16 to rotate the lever 34 counterclockwise.

Hereinafter, according to the film forming apparatus 1 of the above-described embodiment, the load applied to the outer peripheral member 14 by the adjustment portion 16 is determined according to the thickness of the film measured by the thickness sensor 6. Here, the vicinity of the die device 2 is a relatively high temperature due to heat for melting the resin, and thus, the operation rod 36 or the lever 34 receives the heat and is thermally expanded. Accordingly, for example, in a case where the thickness of the film is managed such that a displacement amount of the operation rod 36 becomes a desired value according to the thickness of the measured thickness of the film, the accuracy of the control may be adversely affected. Meanwhile, in the present embodiment, the load to be applied to the outer peripheral member 14 by the operation rod 36 (that is, the adjustment portion 16) is managed to be a desired value according to the measured thickness of the film, and thus, the thickness of the film is controlled. Accordingly, even when the operation rod 36 or the lever 34 is thermally expanded, it is possible to control the thickness of the film with high accuracy.

In addition, according to the film forming apparatus 1 of the present embodiment, the rotation force of the actuator 24 is transmitted to the flexible lip portion 22 via the lever 34. That is, the rotation force of the actuator is amplified according to a principle of the lever and transmitted to the flexible lip portion 22. Therefore, an output required for actuator 24 can be relatively reduced. Thus, for example, the number of bellows required for the actuator 24 can be reduced. Alternatively, the size of each bellows can be reduced.

Second Embodiment

Figure 10:
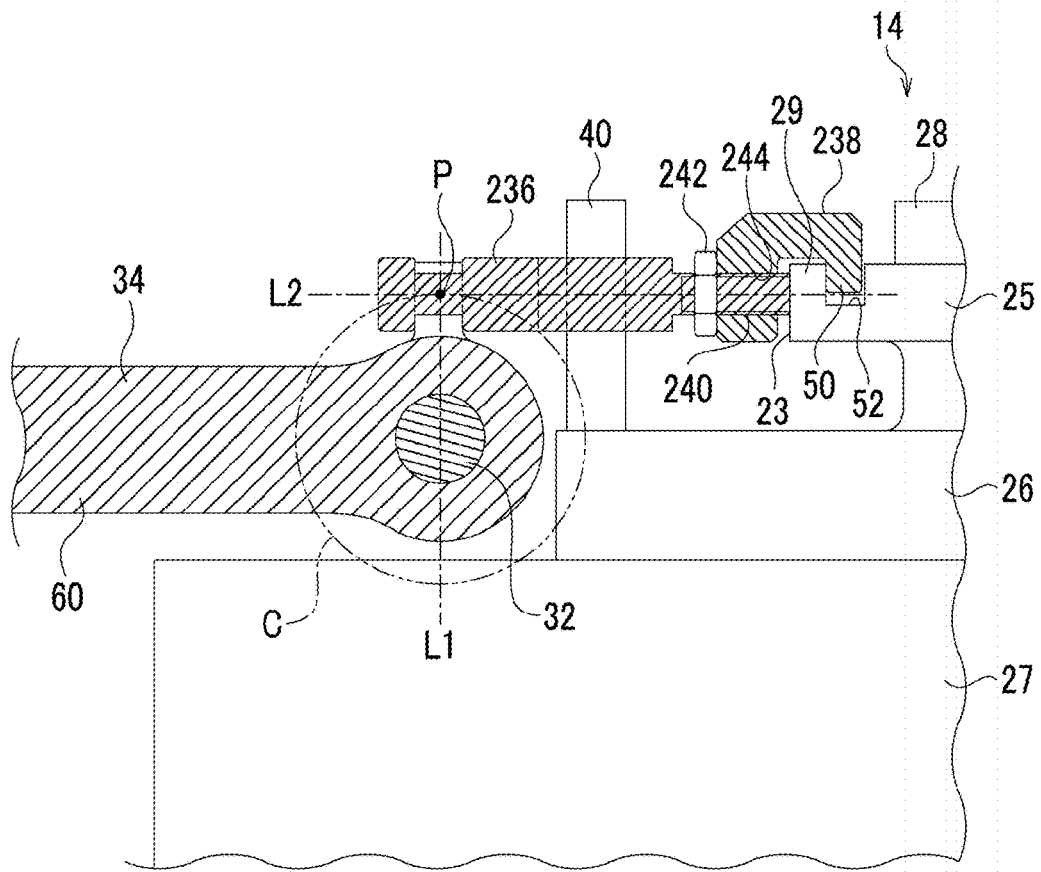
FIG. 10 is a partially enlarged sectional view showing a configuration of an adjustment portion of a film forming apparatus according to a second embodiment.

Next, a second embodiment will be described. An adjustment portion according to the present embodiment is similar to that of the first embodiment except that connection structures between the operation rod and the flexible lip portion are different from each other. Accordingly, the same reference numerals are assigned to the components similar to those of the first embodiment, and descriptions thereof are omitted. FIG. 10 is a partially enlarged sectional view showing a configuration of the adjustment portion according to the second embodiment.

In the present embodiment, a male screw portion 240 is provided on a radially inner side of an operation rod 236. A nut 242 is screwed to a base end portion of the male screw portion 240. Meanwhile, a connection member 238 has a U-shaped longitudinal cross section and a female screw portion 244 which can be screwed to the male screw portion 240 is formed on an upper portion of the connection member 238 to penetrate the connection member 238.

According to this configuration, the male screw portion 240 is screwed to the female screw portion 244 to penetrate the female screw portion 244, and thus, a tip surface of the operation rod 236 is pressed to the pressure receiving surface 23 of the flexible lip portion 22, and the operation rod 236 and the flexible lip portion 22 are securely fixed to each other. In this case, the fixing between the operation rod 236 and the connection member 238 can be stabilized by fastening the nut 242. In this case, a portion of the flexible lip portion 22 is interposed the engagement portion 50 of the connection member 238 and the tip portion of the operation rod 236, and thus, the operation rod 236 is connected to the flexible lip portion 22 in the axial direction.

Third Embodiment

Figure 11:
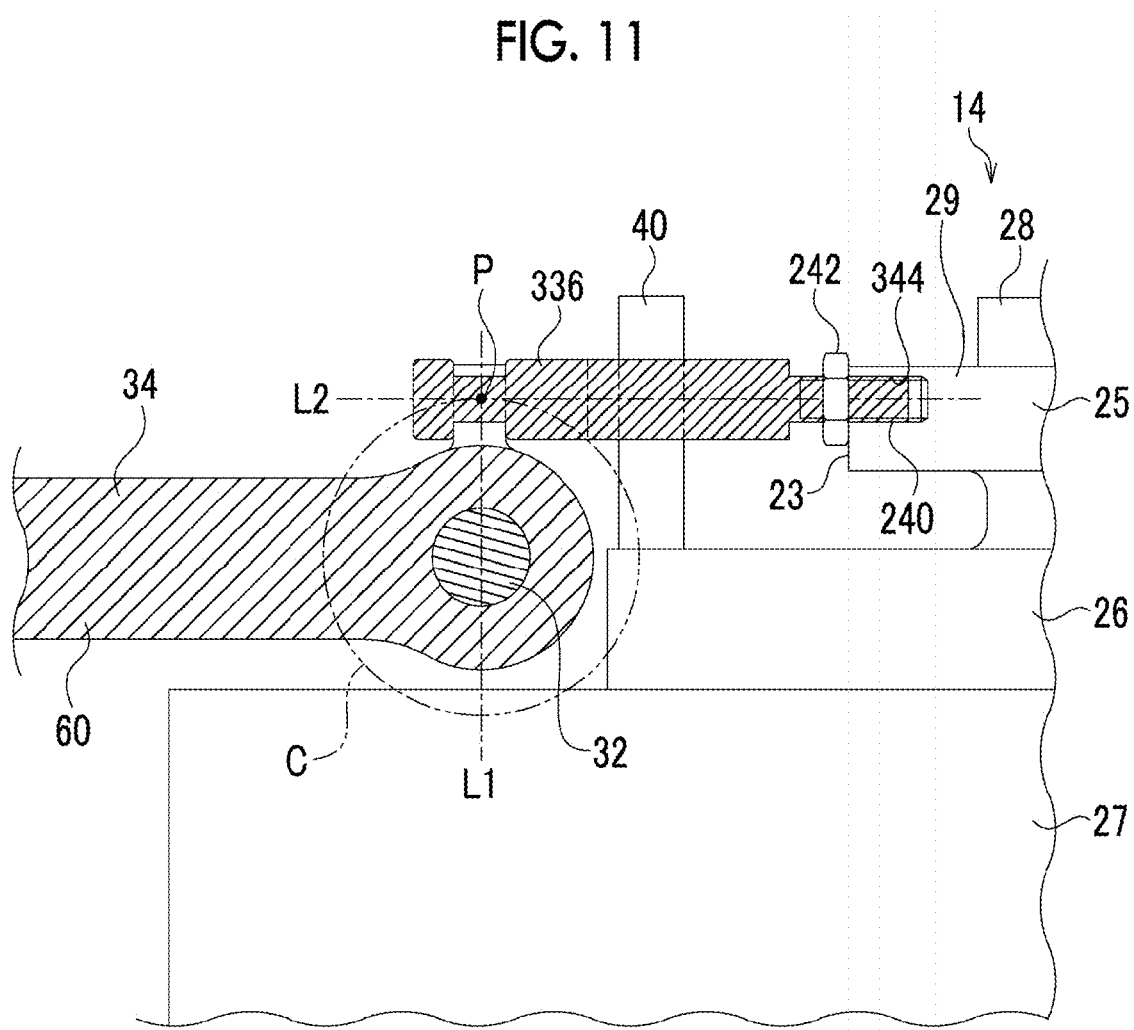
FIG. 11 is a partially enlarged sectional view showing a configuration of an adjustment portion of a film forming apparatus according to a third embodiment.

Next, a third embodiment will be described. An adjustment portion according to the present embodiment is similar to that of the second embodiment except that connection structures between the operation rod and the flexible lip portion are different from each other. Accordingly, the same reference numerals are assigned to the components similar to those of the second embodiment, and descriptions thereof are omitted. FIG. 11 is a partially enlarged sectional view showing a configuration of the adjustment portion according to the third embodiment.

Similarly to the second embodiment, in the present embodiment, the male screw portion 240 is provided in a lower portion of the operation rod 336, and a nut 242 is screwed to a base end portion of the operation rod 336. Meanwhile, instead of the engagement groove 52, a female screw portion 344 extending radially inward from the pressure receiving surface 23 is provided in the protruding surrounding portion 29 of the flexible lip portion 22, and thus, the male screw portion 240 can be screwed to the female screw portion 344 in the axial direction.

In this configuration, the male screw portion 240 is screwed to the female screw portion 344, and thus, the operation rod 336 and the flexible lip portion 22 can be directly connected to each other. In this case, the operation rod 336 and the flexible lip portion 22 are securely fixed to each other by fastening the nut 242. In this case, it is possible to set a positional relationship between the operation rod 336 and the lever 34 with high accuracy by adjusting a screw insertion amount of the male screw portion 240 to the female screw portion 344. That is, the direction of the rotation force of the lever 34 at the action point P and the axial direction of the operation rod 336 can coincide with each other.

Fourth Embodiment

Figure 12:
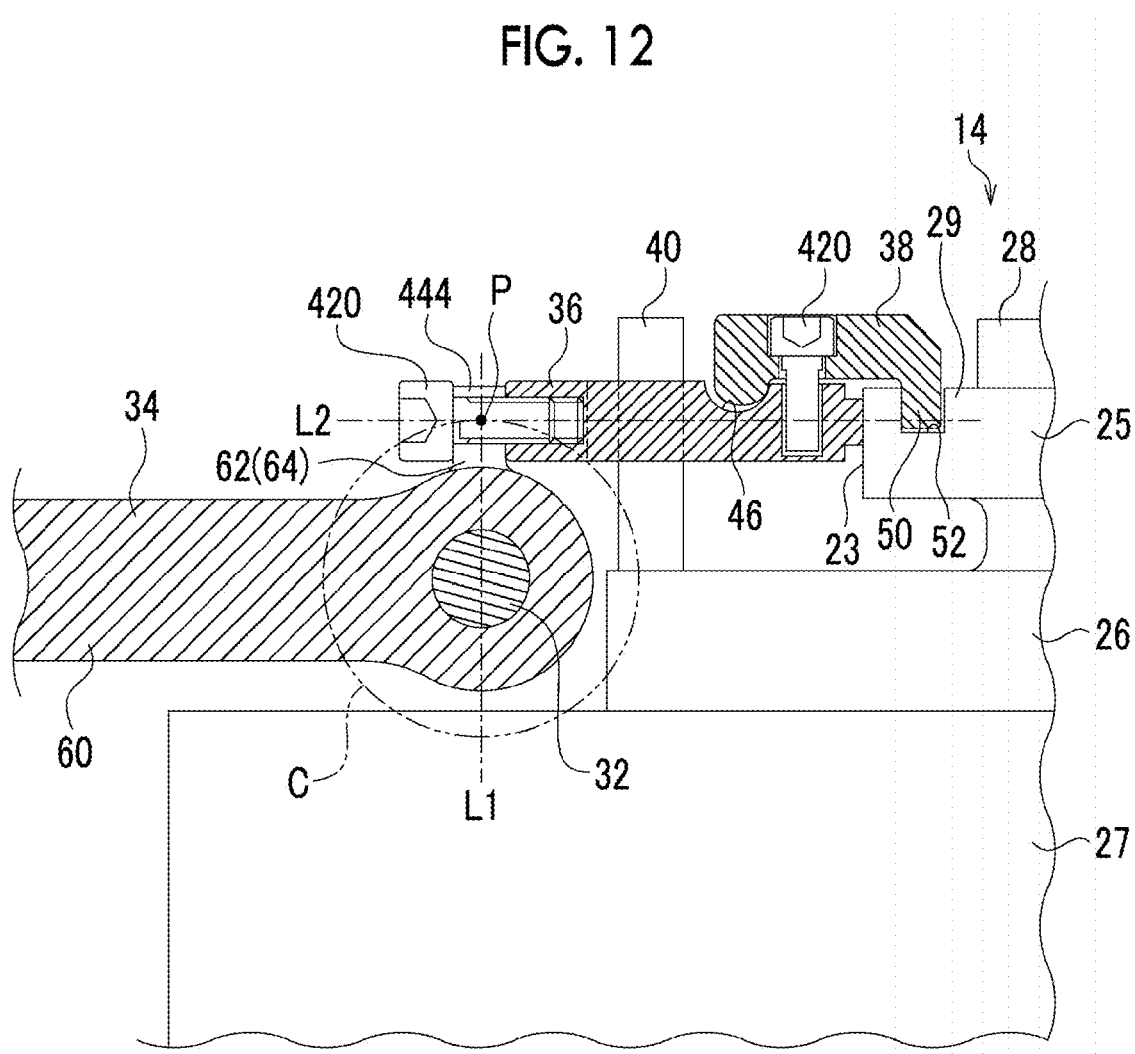
FIG. 12 is a partially enlarged sectional view showing a configuration of an adjustment portion of a film forming apparatus according to a fourth embodiment.

Next, a fourth embodiment of the present invention will be described. An adjustment portion according to the present embodiment is similar to that of the first embodiment except that connection structures between the operation rod and the lever are different from each other. FIG. 12 is a partially enlarged sectional view showing a configuration of the adjustment portion according to the fourth embodiment.

In the present embodiment, a screw 420 is attached to an outer peripheral side end portion of an operation rod 436 in the axial direction, and thus, a reduced diameter portion 444 is formed between the outer peripheral side end of the operation rod 436 and a head portion of the screw 420. In addition, the connection portion 62 of the lever 34 is attached to the reduced diameter portion 444. According to this configuration, unlike the first embodiment, a process of machining the reduced diameter portion 44 on the outer peripheral surface of the operation rod 36 is not required. The reduced diameter portion 444 is a point configuring the action point P and requires high accuracy. Accordingly, a cutting or the like omitted, and thus, a manufacturing cost can be reduced. In addition, for example, it is possible to more securely connect the operation rod 436 and the lever 34 to each other by increasing fastening strength of the screw 420.

Fifth Embodiment

Figure 13:
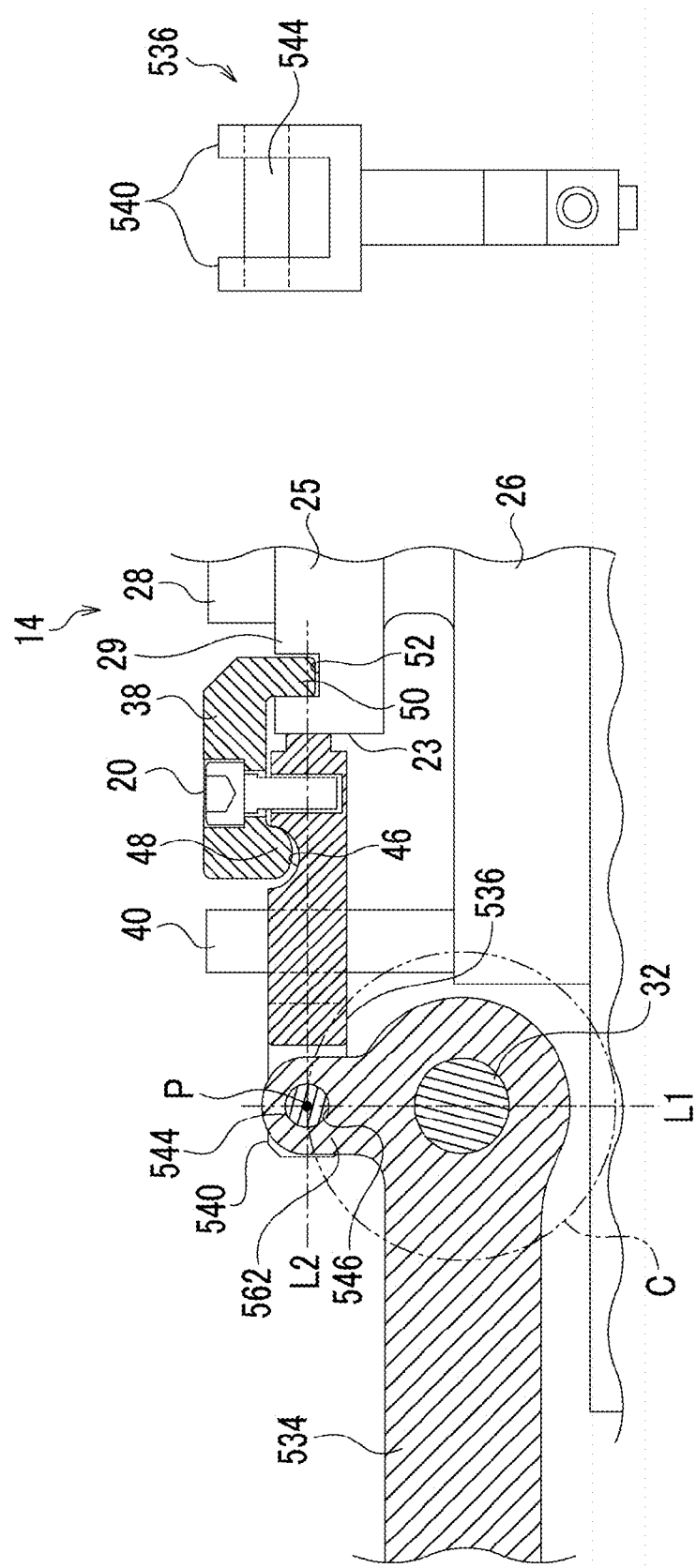
FIGS. 13A and 13B are views showing a configuration of an adjustment portion of a film forming apparatus according to a fifth embodiment.

Next, a fifth embodiment will be described. An adjustment portion according to the present embodiment is similar to that of the first embodiment except that connection structures between the operation rod and the lever are different from each other. FIGS. 13A and 13B are view showing a configuration of the adjustment portion of the fifth embodiment. FIG. 13A is a partially enlarged sectional view showing a connection portion between an operation rod and a lever and a structure around the connection portion, and FIG. 13B is a front view of the operation rod.

In the present embodiment, a bifurcated arm portion 540 is provided in an outer peripheral side end portion of an operation rod 536, and a rotary shaft 544 is provided so as to traverse the arm portion 540. Meanwhile, a connection portion 562 of a lever 534 is not formed in a bifurcate shape unlike the first embodiment but extends in a flange shape, and has an insertion hole 546 for inserting the rotary shaft 544 at the center thereof. The connection portion 562 is rotatably connected to the rotary shaft 544. According to this configuration, the position of the rotary shaft 544 becomes the action point of the lever 534. Since the lever 534 is relatively rotatable at the connection portion with the operation rod 536, in a case where the operation rod 536 is displaced to a relatively large extent, there is an advantage such as preventing an excessive load from being applied to the action point P, or the like.

Hereinbefore, the configuration and the operation of the film forming apparatus according to the embodiments are described. It is to be understood by a person skilled in the art that the embodiments are examples, that various modifications can be made to combinations of the respective constituent elements, and that the modifications are also within the scope of the present invention.

Modification Example 1

Figure 14:
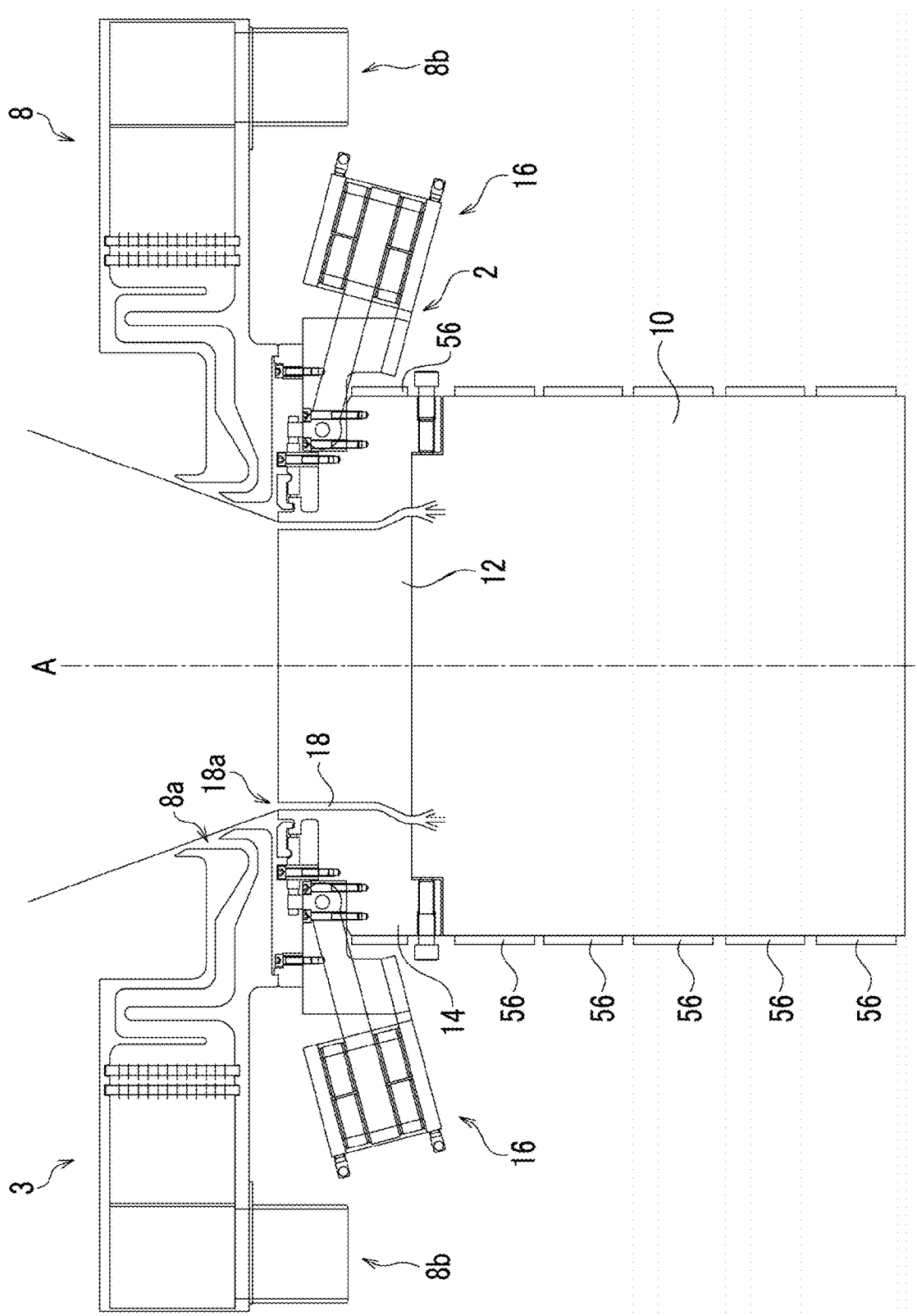
FIG. 14 is a sectional view showing an upper portion of a die device of a film forming apparatus according to a modification example and the vicinity of the upper portion.
Figure 15:
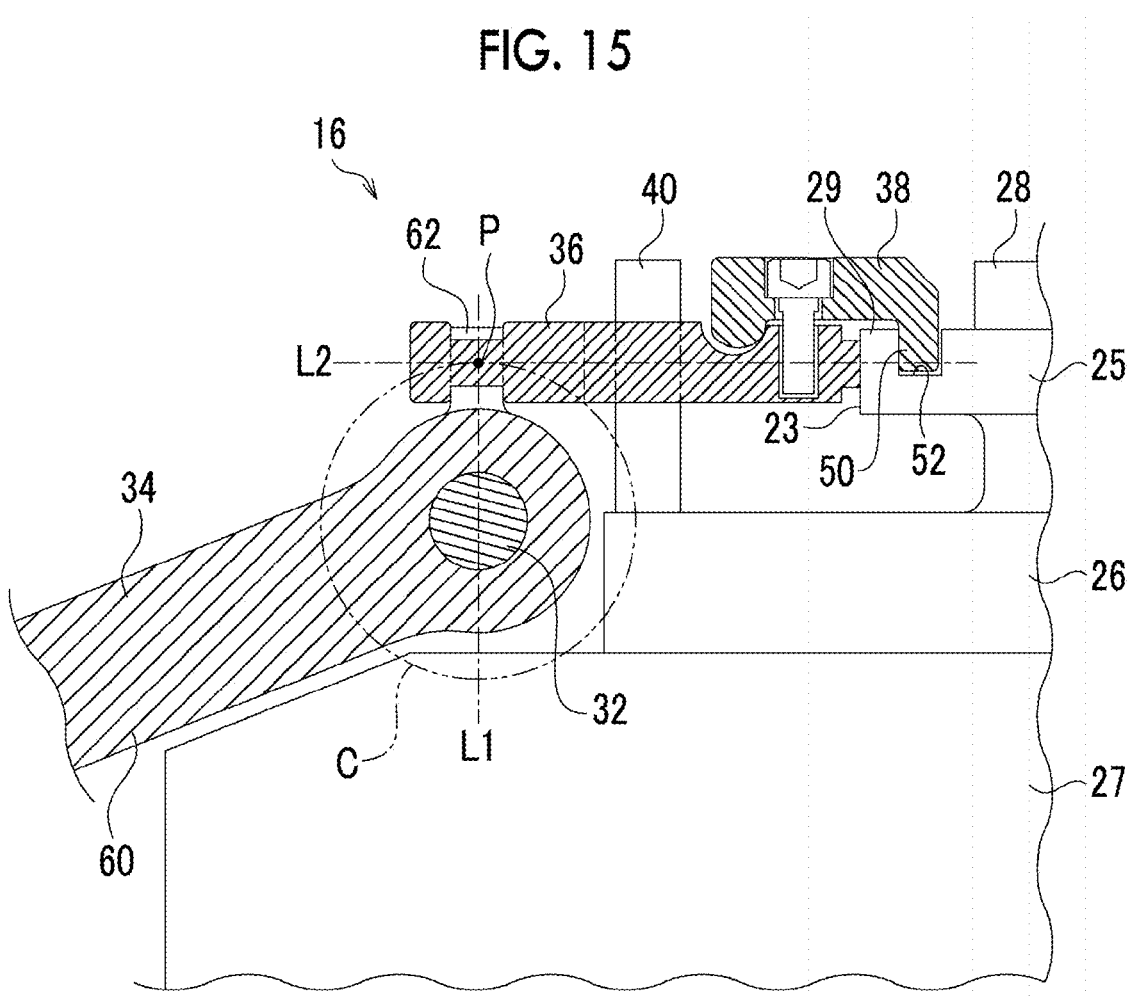
FIG. 15 is a partially enlarged sectional view showing a configuration of an adjustment portion of FIG. 14.

FIG. 14 is a sectional view showing an upper portion of a die device 2 of a film forming apparatus according to a modification example and the vicinity of the upper portion. FIG. 14 corresponds to FIG. 2. FIG. 15 is a partially enlarged sectional view showing a configuration of an adjustment portion of FIG. 14. FIG. 15 corresponds to FIG. 8A. In the present modification example, the extension direction (the direction in which the rotary shaft 32 and the action point P are connected to each other) of the connection portion 62 forms an obtuse angle with the axis of the main body 60, and in the non-operation state of the lever 34, the axis of the main body 60 and the axis of the operation rod 36 are not parallel to each other. Since the load is applied to the outer peripheral member 14 based on the rotation force of the actuator, the axis of the main body 60 and the axis of the operation rod 36 cannot be parallel to each other as described above. In this case, a freedom of arrangement of adjustment portion 16 is improved.

Modification Example 2

Figure 16:
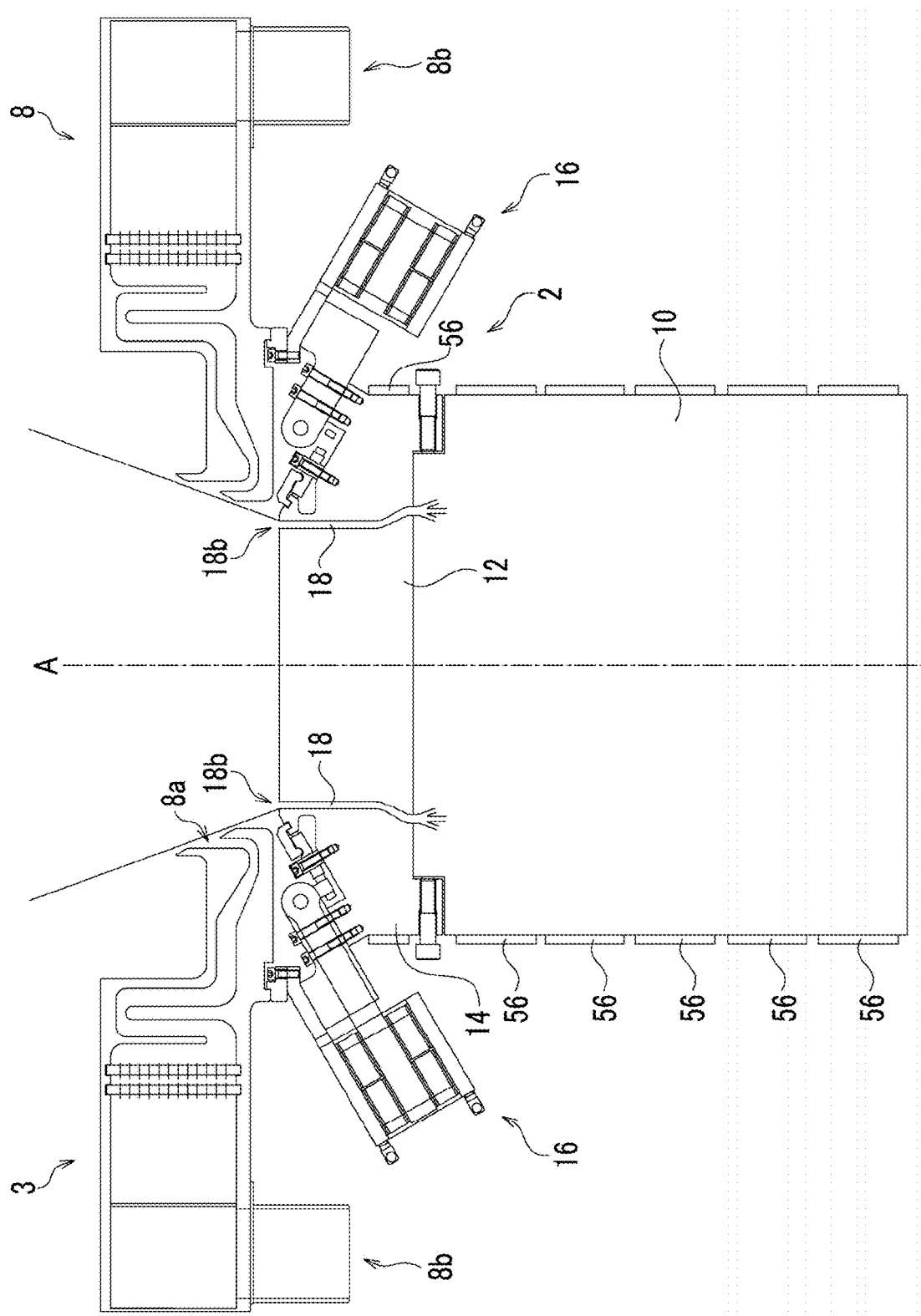
FIG. 16 is a sectional view showing an upper portion of a die device of a film forming apparatus according to another modification example and the vicinity of the upper portion.
Figure 17:
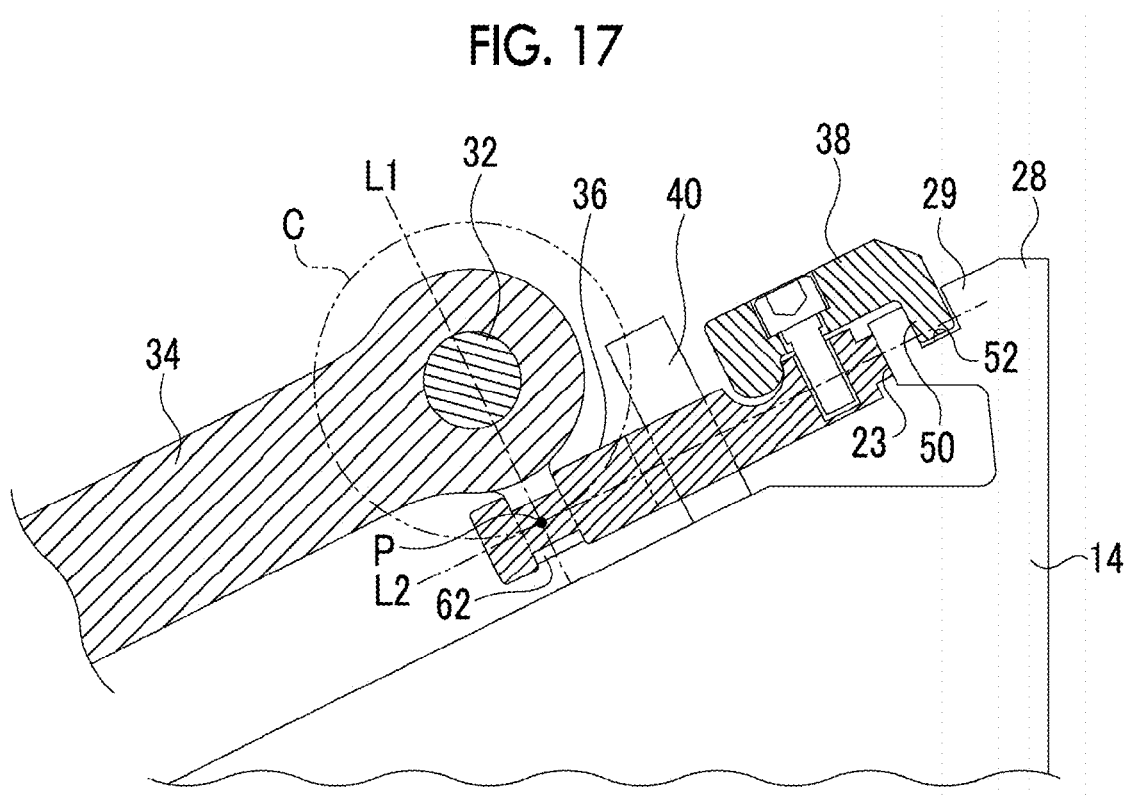
FIG. 17 is a partially enlarged sectional view showing a configuration of an adjustment portion of FIG. 16.

FIG. 16 is a sectional view showing an upper portion of a die device 2 of a film forming apparatus according to another modification example and the vicinity of the upper portion. FIG. 16 corresponds to FIG. 2. FIG. 17 is a partially enlarged sectional view showing a configuration of an adjustment portion of FIG. 16. FIG. 17 corresponds to FIG. 8A. In the present modification example, the adjustment portion 16 is disposed to apply a load to the outer peripheral member 14 upward in the axial direction. According to the film forming apparatus according to the present modification example, effects similar to those exerted by the film forming apparatuses according to the embodiments are exerted.

Modification Example 3

In the above-described embodiments, the case where the adjustment portion 16 is disposed outside the outer peripheral member 14 and applies the pressing load or the tensile load to the outer peripheral member 14 so as to elastically deform the outer peripheral member 14 is described. However, the present invention is not limited to this. The adjustment portion 16 may apply a load to the inner peripheral member 12 so as to elastically deform the outer peripheral member 14, and thus, a radial width of the discharge port of the slit 18 may be partially changed. In this case, the inner peripheral member 12 may be formed in a hollow shape, and the adjustment portion 16 may be disposed in the hollow portion. In addition, for example, the storage unit 80 stores the thickness of the film and the load to be applied to the inner peripheral member 12 by the adjustment portion 16 such that the film having the thickness is formed so as to have a target thickness, in association with each other.

Modification Example 4

In the embodiments, the case is described in which the storage unit 80 stores the thickness of the film and the load to be applied to the outer peripheral member 14 by the adjustment portion 16 such that the film having the thickness is formed so as to have a target thickness, in association with each other. However, the present invention is not limited to this. The storage unit 80 may store information relating to a relationship between the thickness of the film and the load to be applied to the outer peripheral member 14 by the adjustment portion 16. For example, the storage unit 80 may store a relational expression indicating a relationship between the thickness of the film and the load to be applied to the outer peripheral member 14 by the adjustment portion 16 such that the film having the thickness is formed so as to have the target thickness. In this case, the determination unit 82 may determine the load to be applied to outer peripheral member 14 by the plurality of adjustment portions 16 such that variations in the thickness decrease. In addition, the determination unit 82 may calculate how many pressures of the bellows 70 to 73 of the adjustment portion 16 to be controlled so that the determined load is applied to the outer peripheral member 14.

In addition, the storage unit 80 stores the thickness of the film and the pressures of the bellows 70 to 73 to realize the load to be applied to the inner peripheral member 14 by the adjustment portion 16 such that the film having the thickness is formed so as to have a target thickness, in association with each other. In this case, the determination unit 82 may determine the pressures of the bellows 70 to 73 may be determined with reference to the thickness measured by the thickness sensor 6 and the storage unit 80.

Modification Example 5

In the embodiments, the configuration is described in which both the tensile load and the pressing load can be applied to the flexible lip portion by the lever and the operation rod driven by the actuator. That is, the neutral state of the adjustment portion can be converted into the expansion operation or the narrow operation of the flexible lip portion. In a modification example, only one of the tensile load and the pressing load can be applied to the flexible lip portion, and only one of the expansion operation and the narrow operation of the flexible lip portion can be operated. For example, one end side of the operation rod 36 may be connected to the flexible lip portion 22 such that a biasing force (drive force) can be applied in only one of a pressing direction and a tension direction with respect to the flexible lip portion 22. In this case, if the biasing force is released via the operation rod 36, the flexible lip portion 22 may be returned to a state in which the biasing force generated by elasticity thereof or the like is applied to the flexible lip portion 22.

Modification Example 6

In the embodiments, the configuration is exemplified in which the pneumatic drive type actuator is adopted as the actuator 24, and when the compressed air is supplied to one of the bellows 70 and 72 and the bellows 71 and 73, the other is open to the atmosphere. In a modification example, a configuration may be adopted in which the compressed air is supplied to both of the bellows 70 and 72 and the bellows 71 and 73 to generate a pressure difference therebetween such that the tensile load or the pressing load is applied to the flexible lip portion. For example, an individual pressure regulating valve is provided in the bellows 70 and 72 and the bellows 71 and 73, and thus, the pressure difference therebetween is generated.

Modification Example 7

In the embodiments, the configuration is exemplified in which tension bellows 70 and 72 and pressing bellows 71 and 73 are respectively provided on both sides of one lever. In a modification example, a configuration may be adopted in which the bellow is provided on only one side of the one lever and the lever is operated in the tension direction or the pressing direction by booting or decompressing the bellows.

Modification Example 8

In the embodiments, the pneumatic drive type actuator is adopted as the actuator 24. However, a type driven by a water pressure or a hydraulic pressure may be adopted. In addition, a circular type bellows is adopted as the bellows. However, other shapes such as a rectangular shape can be adopted. In addition, other actuators driven by a motor may be adopted.

Modification Example 9

Figure 18:
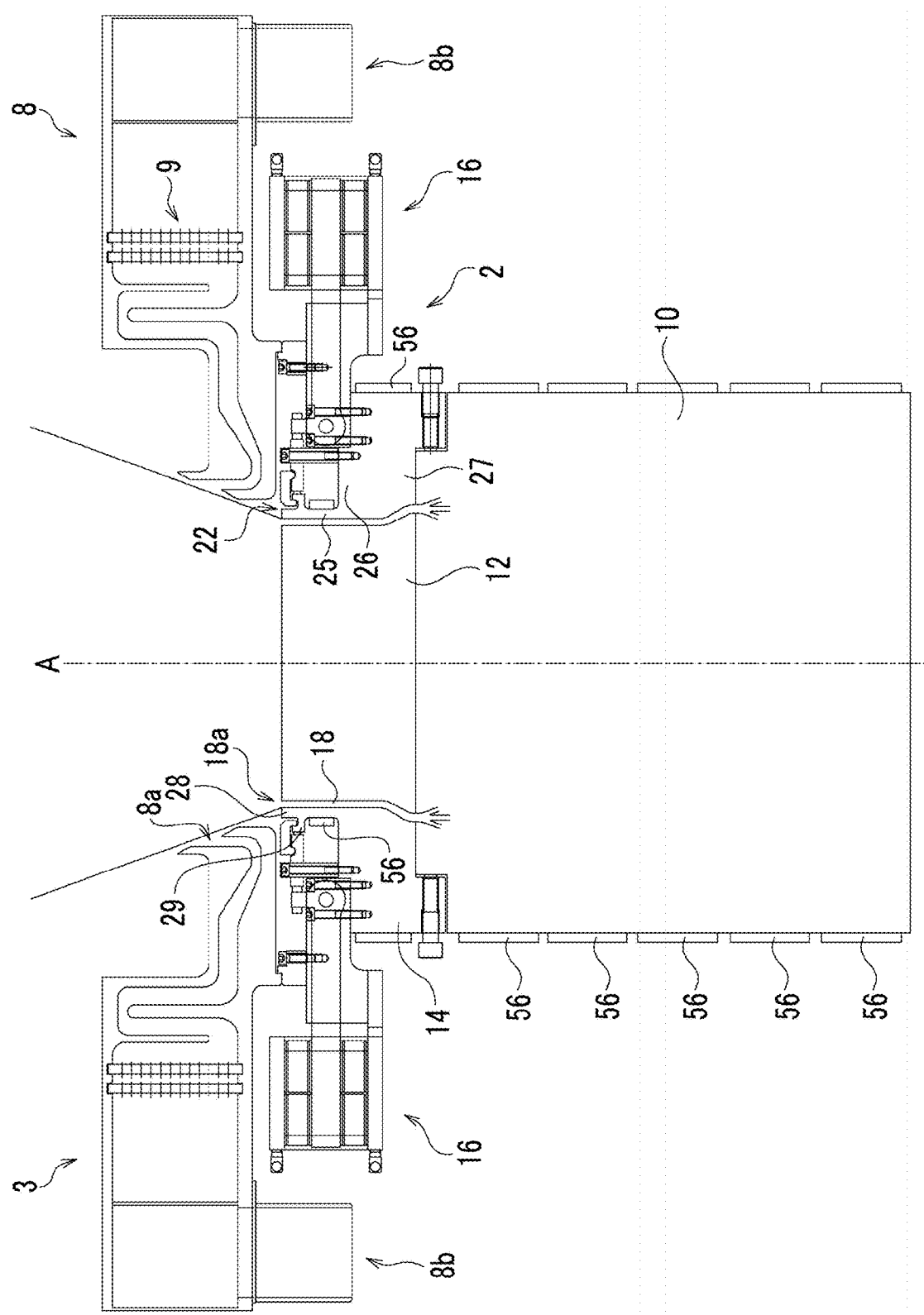
FIG. 18 is a sectional view showing an upper portion of a die device of a film forming apparatus according to still another modification example and the vicinity of the upper portion.

FIG. 18 is a sectional view showing an upper portion of a die device 2 of a film forming apparatus according to still another modification example and the vicinity of the upper portion. FIG. 18 corresponds to FIG. 2.

In the present modification example, the heater 56 is mounted on an outer periphery of the upper portion of the outer peripheral member 14, specifically, an outer periphery of the small-diameter portion 25 of the outer peripheral member 14. In the upper portion of the outer peripheral member 14, the heater 56 is mounted at a location at which the temperature of the molten resin is easily decreased by influences of the cooling air from the air ring 8, that is, the outer periphery of the small-diameter portion 25, and thus, an appropriate temperature of the molten resin can be maintained, and the molten state can be appropriately maintained. As a result, quality of the film can be improved. Moreover, similarly to the embodiments, the present modification example, the thickness of the film is controlled by managing the load to be applied to the outer peripheral member 14 so as to be a desired value. Accordingly, even when the member configuring the adjustment portion 16 is expanded by the heat for melting the resin, it is possible to control the thickness of the film with high accuracy. Therefore, the heater 56 can be mounted on the outer periphery of the small-diameter portion 25 of the outer peripheral member 14.

In addition, in the present modification example, in the small-diameter portion 25, a portion of the small-diameter portion 25 below the protruding surrounding portion 29, that is, a deformation portion which is elastically deformed is formed to be longer than that of the first embodiment in the axial direction. Accordingly, a variable amount of the flexible lip portion 22 increases, and an adjustment range of the thickness of the film increases.

In addition, in a case where the inner peripheral member 12 is formed in a hollow shape, the heater 56 may be attached to the inner periphery of the inner peripheral member 12 instead of the outer periphery of the upper portion of the outer peripheral member 14 or in addition to the outer periphery of the upper portion of the outer peripheral member 14.

It should be understood that the invention is not limited to the above-described embodiment, but may be modified into various forms on the basis of the spirit of the invention. Additionally, the modifications are included in the scope of the invention.

According to the present invention, it is possible to provide the film forming apparatus capable of controlling the thickness of the film with relatively high accuracy.

What is claimed is:

1. A film forming apparatus comprising:
a die device which extrudes a molten resin in a tube shape to form a film; and
a controller which controls the die device,
wherein the die device includes:
an inner peripheral member which defines an inner periphery of an annular discharge port,
an outer peripheral member which surrounds the inner peripheral member and defines an outer periphery of the discharge port,
an adjustment portion which applies a load to one of the inner peripheral member and the outer peripheral member to elastically deform the one of the inner peripheral member and the outer peripheral member and change a radial width of the discharge port, and
a cooling device configured to cool the molten resin, the cooling device is fixed to a portion above the adjustment portion;
wherein the controller controls a thickness of the film with the load applied by the adjustment portion,
the adjustment portion comprises:
a pressure regulated pneumatic drive type actuator that outputs a rotation force;
a lever that receives the rotation force;
a rotary shaft, the lever is rotatable about the rotary shaft according to the rotation force, and
an operation rod displaceable in an axial direction,
the rotation force applied to the lever is converted into an axial force of the operation rod at an action point, and the axial force transmitted to the operation rod becomes the load with respect to the inner peripheral member or the outer peripheral member, and
a straight line which connects the action point and the rotary shaft is orthogonal to the axial direction when the load is not applied to the inner peripheral member or the outer peripheral member such that a direction of the rotation force of the lever at the action point coincides with the axial direction and wherein a main body of the lever including a force point of the lever and the operation rod are approximately parallel to each other.

2. The film forming apparatus according to claim 1, further comprising:
a thickness sensor which measures the thickness of the film,
wherein the controller includes
a determinator which determines a value relating to the load applied by the adjustment portion according to the thickness measured by the thickness sensor, and
an adjustment operation controller which operates the adjustment portion based on the value determined by the determinator.

3. The film forming apparatus according to claim 2,
wherein the controller includes a storage which stores information relating to a relationship between the thickness of the film and the load to be applied by the adjustment portion, and
wherein the determinator determines the value relating to the load applied by the adjustment portion, based on the thickness measured by the thickness sensor and the information stored in the storage.

4. The film forming apparatus according to claim 1, further comprising:
a connection member which connects the operation rod and the inner peripheral member or the outer peripheral member to each other,
wherein a relative position between the operation rod and the inner peripheral member or the outer peripheral member is adjusted by the connection member.

* * * * *